US007672557B2

(12) United States Patent
Allen et al.

(10) Patent No.: US 7,672,557 B2
(45) Date of Patent: Mar. 2, 2010

(54) OPTICAL FIBER AND A METHOD FOR FABRICATING A LOW POLARIZATION-MODE DISPERSION AND LOW ATTENUATION OPTICAL FIBER

(75) Inventors: Martin W. Allen, Wilmington, NC (US); Dana C. Bookbinder, Corning, NY (US); Dipakbin Q. Chowdhury, Corning, NY (US); Daniel W. Hawtof, Painted Post, NY (US); Dale R. Powers, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1014 days.

(21) Appl. No.: 11/359,223

(22) Filed: Feb. 21, 2006

(65) Prior Publication Data

US 2006/0140560 A1    Jun. 29, 2006

Related U.S. Application Data

(63) Continuation of application No. 09/558,770, filed on Apr. 26, 2000, now abandoned.

(60) Provisional application No. 60/131,012, filed on Apr. 26, 1999.

(51) Int. Cl.
*G02B 6/36* (2006.01)
*G02B 6/00* (2006.01)

(52) U.S. Cl. .................... 385/127; 385/123; 385/126

(58) Field of Classification Search ................. 385/123, 385/126–128
See application file for complete search history.

(56) References Cited

U.S. PATENT DOCUMENTS 3,711,262 A * 1/1973 Keck ........................... 65/417

(Continued)

FOREIGN PATENT DOCUMENTS

DE         3635819 A1    10/1986

(Continued)

OTHER PUBLICATIONS

Barlow et al, "Production Of Single-Mode Fibers With Negligible Intrinsic Birefringence And Polarisation Mode Dispersion," Oct. 1, 1981, IEEE Electronic Letters, vol. 17, No. 20, pp. 725-726.*

(Continued)

*Primary Examiner*—Uyen-Chau N Le
*Assistant Examiner*—Rhonda S Peace
(74) *Attorney, Agent, or Firm*—Robert L. Carlson

(57) ABSTRACT

A method of fabricating an optical waveguide fiber that includes the steps of providing a cylindrical glass optical fiber preform having a longitudinally extending centerline hole, and closing the hole under conditions suitable to result in uniform and symmetric hole closure. The method may include first plugging a first end and a second end of the centerline hole to prevent gas flow therethrough. The method preferably involves closing the centerline hole of the preform by drawing the preform down into an optical waveguide fiber.

12 Claims, 8 Drawing Sheets

U.S. PATENT DOCUMENTS

| | | | |
|---|---|---|---|
| RE28,028 E * | 6/1974 | Maurer | 65/417 |
| 3,877,912 A * | 4/1975 | Shiraishi et al. | 65/412 |
| 4,154,591 A | 5/1979 | French et al. | 65/2 |
| 4,154,592 A | 5/1979 | Bailey | 65/2 |
| 4,157,906 A | 6/1979 | Bailey | 65/3 |
| 4,636,235 A | 1/1987 | Glessner et al. | 65/3.12 |
| 4,859,222 A | 8/1989 | Bauch et al. | 65/3.12 |
| 5,127,929 A | 7/1992 | Günther et al. | 65/3.15 |
| 5,152,818 A * | 10/1992 | Berkey et al. | 65/412 |
| 5,167,684 A * | 12/1992 | Turpin et al. | 65/379 |
| 5,581,647 A * | 12/1996 | Onishi et al. | 385/123 |
| 5,704,960 A * | 1/1998 | Evans et al. | 65/402 |
| 5,802,235 A * | 9/1998 | Akasaka | 385/123 |
| 5,867,616 A * | 2/1999 | Antos et al. | 385/11 |
| 5,897,680 A * | 4/1999 | Geertman | 65/402 |
| 5,917,109 A * | 6/1999 | Berkey | 65/412 |
| 6,076,376 A * | 6/2000 | Onishi et al. | 65/402 |
| 6,105,396 A * | 8/2000 | Glodis et al. | 65/377 |
| 6,240,748 B1 * | 6/2001 | Henderson et al. | 65/402 |
| 6,324,872 B1 * | 12/2001 | Blaszyk et al. | 65/504 |
| 6,516,636 B1 * | 2/2003 | Gansicke et al. | 65/379 |
| 6,550,281 B1 * | 4/2003 | Hawk | 65/402 |

FOREIGN PATENT DOCUMENTS

| | | |
|---|---|---|
| GB | 2178737 A | 2/1987 |
| JP | 01-148725 | 6/1989 |
| JP | 01-160841 | 6/1989 |

OTHER PUBLICATIONS

Patent Abstract of Japan, Publication No. 01160841, published Jun. 23, 1989 relating to Application No. 62316072, in the name of Sumitomo Electric Ind Ltd., entitled "Production of Optical Fiber".
T. Katsuyama et al., "Reduced Pressure Collapsing MCVD Method For Single Polarization Optical Fibers", Journal of Lightwave Technology, Oct. 1984, vol. LT-2, No. 5, pp. 634-639.

* cited by examiner

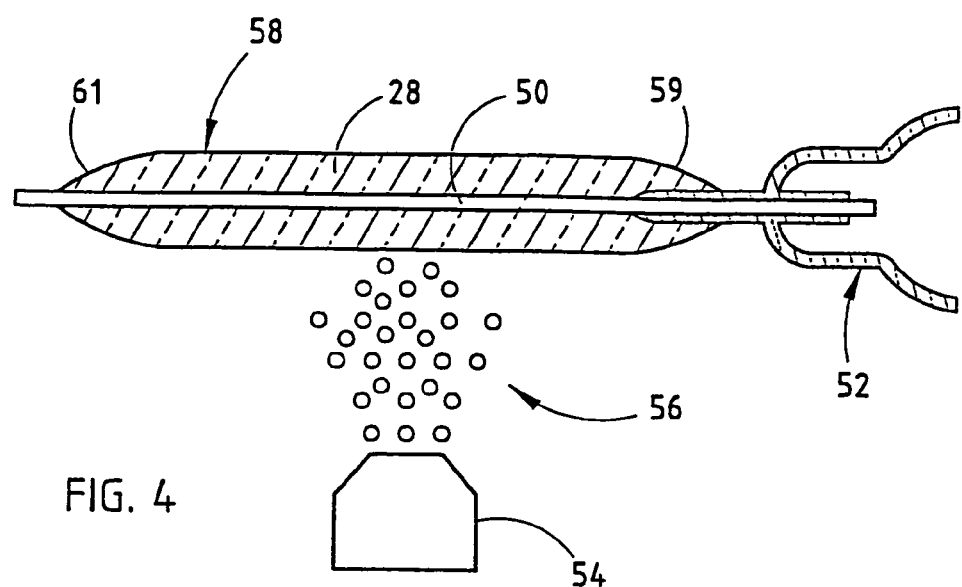
FIG. 4
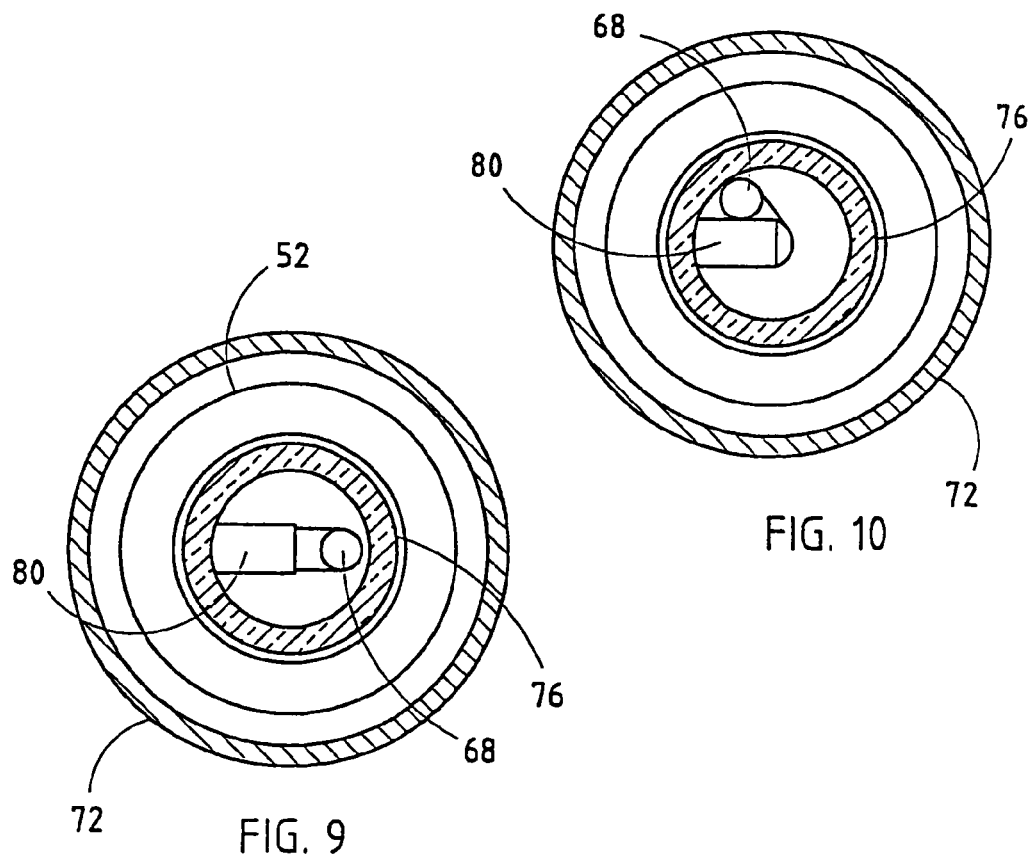
FIG. 9
FIG. 10

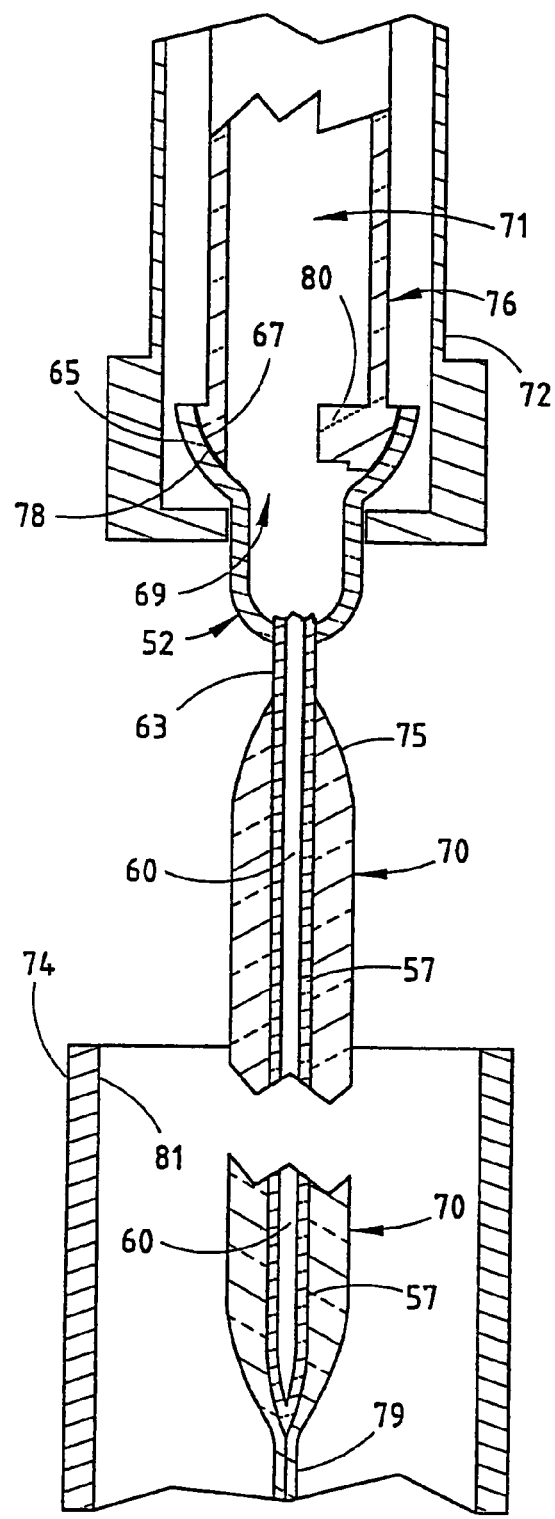
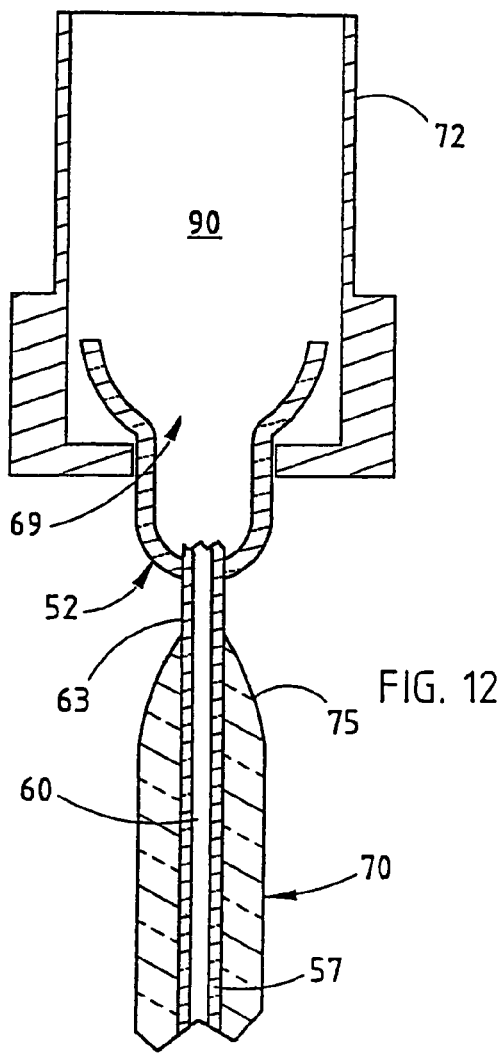
FIG. 11
FIG. 12

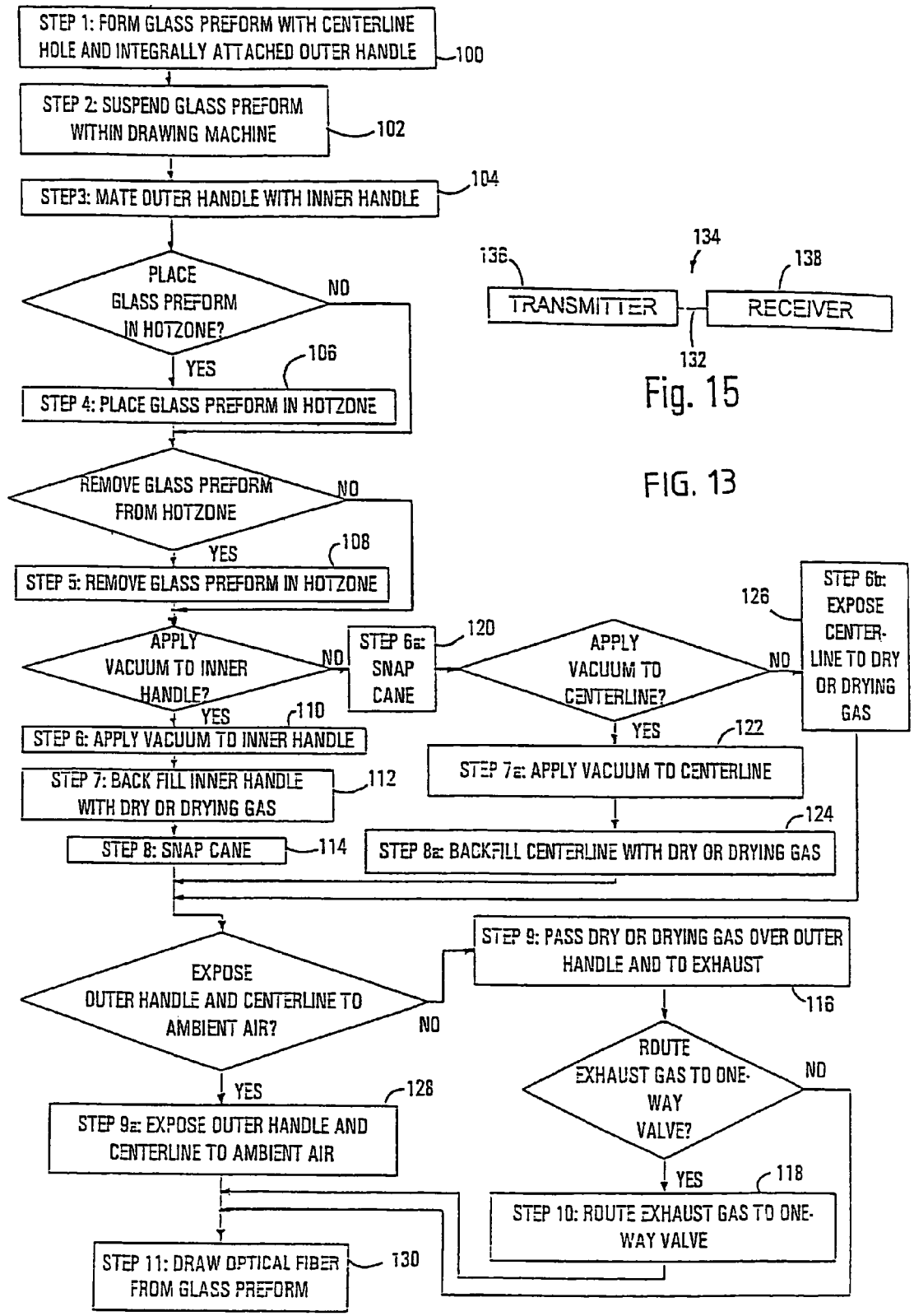

OPTICAL FIBER AND A METHOD FOR FABRICATING A LOW POLARIZATION-MODE DISPERSION AND LOW ATTENUATION OPTICAL FIBER

CROSS-REFERENCE TO RELATED APPLICATIONS

This application is a continuation of U.S. application Ser. No. 09/558,770, filed on Apr. 26, 2000, now abandoned which claims the benefit of priority of U.S. Provisional Application No. 60/131,012, filed Apr. 26, 1999, entitled OPTICAL FIBER HAVING SUBSTANTIALLY CIRCULAR CORE SYMMETRY AND METHOD OF MANUFACTURING THE SAME.

BACKGROUND OF THE INVENTION

1. Field of the Invention

The present invention relates generally to the field of optical waveguide fibers, and more particularly to methods of making low polarization-mode dispersion and low attenuation optical waveguide fibers.

2. Technical Background

A significant goal of the telecommunications industry is to transmit greater amounts of information, over longer distances, in shorter periods of time. Typically, as the number of systems users and frequency of system use increases, demand for system resources increases as well. One way of meeting this demand is by increasing the bandwidth of the medium used to carry the information. In optical telecommunication systems, the demand for optical waveguide fibers having increased bandwidth is particularly high.

In recent years, significant advancements have been made in the manufacture of optical waveguide fiber, which in turn have increased the usable light carrying capacity of the fiber. However, it is well known that electromagnetic radiation traveling through an optical waveguide fiber is subject to attenuation or lose due to several mechanisms. Although some of these mechanisms cannot be reduced, others have been eliminated, or at least substantially reduced.

A particularly problematic mode of optical fiber attenuation is attenuation due to absorption by the optical waveguide fiber due to impurities present in the light guiding region of the fiber. Particularly troublesome is the attenuation caused by the hydroxyl radical (OH), which can be formed in the optical waveguide fiber when a source of hydrogen is present in the fiber material, or when hydrogen available from several sources during the fiber manufacturing process diffuses into the glass.

Hydrogen bonds with the oxygen available in the $SiO_2$ and/or $GeO_2$ and/or other oxygen containing compounds in the glass matrix to form the OH and/or $OH_2$ bonds. The attenuation increase due to OH or water in the glass can be as high as about 0.5 to 1.0 dB/km, with the attenuation peak generally accompanying the 1380 nm window. As used herein, the phrase, "1380 nm window" is defined as the range of wavelengths between about 1330 nm and about 1470 nm. The attenuation peak, generally referred to as the water peak, has prevented useable electromagnetic transmission in the 1380 nm window.

Until recently, telecommunication systems avoid the water peak residing in the 1380 nm window by operating in the 1310 nm window and/or the 1550 nm window, among others. With the advent of wavelength division multiplexing ("WDM") and advancements in amplifier technology, which enable telecommunication systems to operate over broad wavelength ranges, it is likely that all wavelengths between about 1300 nm and about 1650 nm will be used for data transmission in optical telecommunication systems. Removing the water peak from optical waveguide fiber used with such systems is an important aspect of enabling system operation over this entire range.

In the manufacturing of an optical fiber, a variety of methods can be used to deposit the various soot layers. In the outside vapor deposition ("OVD") process, the soot core blank is formed by depositing silica and germanium containing precursor constituents in the presence of oxygen onto a ceramic bait rod. As the bait rod is rotated, the precursor constituents are delivered to the flame burner to produce soot, and that soot is then deposited onto the bait rod. Once sufficient soot is deposited, the bait rod is removed, and the resultant soot core blank can be consolidated into a glass core blank. The soot core blank is typically consolidated by hanging the soot core blank in a consolidation furnace and heating the soot core blank to a temperature and for a time sufficient to consolidate the soot core blank into a glass. Preferably, prior to the consolidating step, the soot core blank is chemically dried, for example, by exposing the soot core blank to chlorine gas at an elevated temperature. The result is a cylindrical glass core blank having an axial hole along its centerline.

This glass core blank is then typically drawn, e.g., by positioning the glass core blank in a furnace, heating the core blank to a temperature of approximately 2000° C., and then redrawing or stretching the core blank into a smaller diameter core cane. During this redraw operation, the centerline hole of the core blank is collapsed by applying considerable vacuum (e.g., a pressure of less than 200 mTorr) along the centerline hole. These vacuum forces ensure complete closure of the glass core blank along the centerline. After the redraw step, the resulting core cane is then typically overclad with a layer of cladding soot by depositing a cladding soot, e.g. via an OVD deposition process. Once covered with sufficient cladding soot, the resultant soot overclad core cane is chemically dried and consolidated to form an optical fiber preform. While different processes (e.g. MCVD and others) may employ somewhat different processes to form components employed in the manufacture of preforms, many of them (e.g. MCVD) commonly end up with a cylindrical tube or other intermediate glass object having a hole therein, which is closed prior to drawing fiber therefrom. These manufacturing processes typically involve utilizing a vacuum at some point during the manufacturing process to close the hole or gap which is present between glass constituents without changing the outer diameter significantly.

The use of a vacuum to close the centerline and other holes in a glass core blank or other optical fiber preforms has some drawbacks. Such vacuum forces can result in a nonsymmetrical centerline profile of the cane, as shown, for example, in FIG. 1. FIG. 1 illustrates a cross section of core cane, indicated generally at 10, which includes a center point 12 surrounded by layers of glass 14. In FIG. 1, these glass layers 14 have an irregular, asymmetric shape, as a result of the application of the vacuum forces during redraw. Only at locations farther from the center point 12 do the layers of glass 16 begin to form more symmetrical and concentric circles or rings about the center point 12. The same non-symmetrical layers of glass present in the core cane will be present when that cane is eventually drawn into an optical fiber. Views of the centerline profile taken at different locations along the length of the core cane (or the optical fiber resulting therefrom) would also show core asymmetry. Further, the geometrical properties of the core cane and resultant optical fiber may change along the length thereof. More specifically, the specific asymmetrical shape at one location along the optical fiber might differ from the shape at another location along the optical fiber.

This asymmetric core geometry is believed to be a key cause of polarization mode dispersion (PMD), a form of dispersion which results when one component of light travels faster than another, orthogonal component. PMD is a severe detriment when present to any significant degree in single mode fibers, as it limits the data transmission rate of fiber-based telecommunications systems. More specifically, single mode fibers and multimode fibers both have an outside diameter of generally about 125 microns. However, single mode fibers have a small, e.g., about 8 micron, core diameter. This dimensional relationship makes single mode fibers extremely sensitive to polarization mode dispersion brought on by non-symmetric hole closure caused during fiber manufacture. Consequently, reduced PMD is a significant goal in fiber manufacture, especially in single mode fibers. In contrast to the small core size of single mode fibers, the core region of a multimode fiber commonly has a diameter of 62.5 microns or 50 microns. In multimode fibers, non-symmetric hole closure has resulted in the inability to tune refractive index profiles on the inner-most portion of the fiber adjacent the centerline. As a result, lasers used to launch light into such fibers are often offset some distance from the centerline of the multimode fiber to avoid this region of non-symmetric hole closure.

One method used to reduce PMD is spinning of the optical fiber during the fiber draw operation, wherein the fiber is mechanically twisted along its centerline axis while being drawn from the molten root of the blank. This twisting enables orthogonal components of light to couple to each other, thus averaging their dispersion and lowering PMD. However, spinning is a fairly complicated process for mitigating the effects of non-symmetric hole closure, and can impede the draw speed, cause coating geometry perturbations, reduce the strength of the optical fiber and so forth. It would therefore be desirable to manufacture fibers having a low PMD without resorting to such spinning techniques.

Additionally, asymmetric core geometry can cause variations in core diameter along the length of the fiber core so that transmitted light "sees" a different core cross-sectional area at different points along the length of the optical fiber. In addition, an asymmetric centerline profile can reduce the bandwidth of laser launched multimode fiber.

Another drawback to the use of vacuum forces to close the centerline hole is that such a process may result in voids along the centerline which further impair the transmissive properties of the optical fiber.

Despite the chemical drying and consolidating steps typically associated with the manufacture of optical waveguide fibers, such optical waveguide fibers have been found to exhibit a relatively high level of attenuation measured at approximately 1380 nm. Because telecommunication systems presently in use today do not operate at or in the immediate vicinity of 1380 nm, this shortcoming has been largely overlooked. With recent advancements made in WDM, amplifier technology, and laser sources, however, eliminating the water peak measured at 1380 nm has become a priority. The water peak is largely a result of water being trapped in the glass during the fiber manufacturing process. In the case of the OVD process, it is believed that a large portion of the water is trapped within the centerline region of the core cane prior to or during closure of the centerline hole. Although the blanks are chemically dried and sintered during consolidation, it has been found that the region of glass surrounding and defining the centerline hole is being rewet after drying. Most commonly, such rewetting occurs through the physisorption, chemisorption, or diffusion of water upon exposure of the centerline hole to an atmosphere that includes a hydrogen containing compound, such as, but not limited to water ($H_2O$) following consolidation.

SUMMARY OF THE INVENTION

The present invention relates to a method of making an optical fiber comprising the steps of providing an intermediate glass object for use in the manufacture of optical fiber, the glass object having a centerline hole therein, heating the glass object to a temperature sufficient to reduce the diameter of the glass object and reducing the outside diameter of the glass object while controlling the pressure inside the centerline hole sufficiently to result in uniform and symmetric hole closure.

One embodiment of the present invention relates to method of manufacturing an optical fiber that includes the steps of providing an intermediate glass object for use in the manufacture of optical fiber, wherein the glass object has a hole or annular void therein at least one end of which is plugged preventing gas flow therethrough, and heating the glass object to a temperature sufficient to reduce the outside diameter of the glass object. The method further includes applying a pressure of greater than 500 Torr to the void, and reducing the outside diameter of the glass object and causing the hole or annular void to close uniformly and symmetrically.

Preferably, the hole closure step is conducted under conditions which are sufficient to result in uniform symmetric heating of the intermediate glass object just prior to and/or during the hole closure step. Such symmetric heating could be achieved, for example, by utilizing a cylindrical furnace when the intermediate glass object is a cylindrically shaped optical fiber preform or other cylindrically shaped intermediate glass object.

Another embodiment of the present invention is an optical fiber that includes a fiber core comprised of layers of glass and having a centerline. The optical fiber further includes a fiber cladding surrounding the fiber core, wherein the layers of glass surrounding the centerline are sufficiently circularly symmetric to result in a polarization mode dispersion of less than 0.2 psec/sqrt-km.

Yet another embodiment of the present invention is an optical fiber communication system comprising a transmitter, a receiver, and an optical fiber for communicating an optical signal between the transmitter and the receiver. The optical fiber includes a fiber core comprising layers of glass and a centerline, and a fiber cladding surrounding the fiber core, wherein the layers of glass surrounding the centerline are sufficiently circularly symmetric to result in a polarization mode dispersion of less than 0.2 psec/sqrt-km.

Still yet another embodiment of the present invention is an optical fiber communication system that includes a transmitter, a receiver, and an optical fiber for communicating an optical signal between the transmitter and the receiver. The optical fiber includes a fiber core of layers of glass and a centerline, and a fiber cladding surrounding the fiber core, wherein the layers of glass surrounding the centerline are sufficiently circular symmetric to result in a polarization mode dispersion of less than 0.2 psec/sqrt-km. The optical fiber also exhibiting less than 3 spin rotations over a longitudinal fiber length of 1 meter.

Yet another embodiment of the present invention relates to a method of fabricating an optical waveguide fiber that includes providing a cylindrical glass fiber preform having a longitudinally extending centerline hole, plugging a first end and a second end of the centerline hole to prevent gas flow therethrough. The method further includes attaching an outer handle to the first end of the preform, wherein the outer handle has a mating end, providing an inner handle for coupling to a gas supply, wherein the inner handle has a mating end and a fluid receiving end, and coupling the mating end of the outer handle with the mating end of the inner handle. The method still further includes exposing the centerline hole of the preform to a gas, heating the preform to a temperature sufficient to soften the preform, and closing the centerline hole of the preform by drawing the preform down into an optical waveguide fiber.

In still yet another embodiment, the present invention, a method of fabricating an optical waveguide fiber that includes providing a cylindrical glass optical fiber preform having a longitudinally extending centerline hole plugged at a first end and a second end to prevent gas flow through the centerline hole, wherein the first end is formed in a bent tab. The method further includes providing an outer handle integrally attached to the first end of the preform, wherein the outer handle has a mating end, providing an inner handle in fluid communication with a gas supply, wherein the inner handle has a mating end, a radially extending breaking tab, and a fluid receiving end, and coupling the mating end of the outer handle with the mating end of the inner handle. The method further includes heating the preform sufficiently to increase the pressure of gas within the centerline hole of the preform, exposing the centerline hole of the preform to a clean dry gas by rotating the outer handle and the inner handle relative to one another until the breaking tab of the inner handle contacts the bent tab of the preform, thereby breaking the bent tab, heating the glass body to a temperature sufficient to soften the preform, and closing the centerline hole of the preform by drawing the preform down into an optical waveguide fiber.

A further embodiment of the present invention is an apparatus for opening an axial aperture of a cylindrical optical fiber preform wherein the axial aperture is plugged at a first end and a second end to prevent gas flow through the aperture, the first end having a frangible bent tab. The preform includes an outer handle attached to the end of the preform and having a mating end, and an inner handle in fluid communication with a gas supply and having a mating end, a fluid receiving end and a radially extending breaking tab, wherein the mating end of the inner handle coupled with the mating end of the outer handle, whereby the axial aperture of the preform is exposed by rotating the outer handle and the inner handle relative to one another until the breaking tab of the inner handle contacts the bent tab of the preform, thereby breaking the bent tab.

Yet a further embodiment of the present invention is a preform for manufacturing an optical fiber that includes a cylindrical glass body having a longitudinally extending axial aperture, a plug at a first end of the body to enclose a first end of the body to enclose a first end of the axial aperture, and a bent glass tab enclosing the opposite end of the axial aperture, wherein the tab includes a radially extending section and a longitudinally extending tip which can be fractured for exposing the axial aperture.

The manufacture of optical fiber and other waveguides in accordance with the present invention achieves a number of advantages over the prior art with respect to the reduction of polarization mode dispersion. Because the centerline holes in the intermediate glass objects of the present invention are closed under conditions to result in uniform and symmetric hole closure, fibers drawn from such intermediate glass objects exhibit greatly reduced polarization mode dispersion compared to fibers in the prior art. In the method of the present invention, in the embodiment wherein the intermediate glass object is an optical fiber preform having a hole therein to be closed at draw the amount of positive or negative pressure applied during draw results in a fiber having a substantially circular centerline profile, i.e., a substantially circular core symmetry, wherein as one moves from the centerline outward, layers of adjacent glass retain a very circular symmetry. This same effect can be achieved on intermediate glass objects that are not fully complete optical fiber preform. For example, the intermediate glass object may be a core cane, preform having a centerline hole therein, and the hole closed during a redraw operation in which the outer diameter of the core cane preform is reduced sufficiently to close the centerline and form a core cane. In this core cane forming and hole-closing step, an amount of positive or negative pressure is applied during drawing of the core cane sufficient to result in symmetric hole closure. Preferably, the hole in said glass intermediate object being closed is not a result of rod in tube manufacturing techniques. As a result, using the techniques of the present invention, single mode fibers have been made which exhibit low polarization mode dispersion without having to resort to spinning or other PMD mitigation methods.

The method of the present invention can also be used to form multimode optical fibers which are inherently better suited for use with laser sources. In laser light launching methods, the spot size of the laser can be small relative to the overall size of the core. if the laser is directed at an area having non-symmetric glass layers, these non-symmetric glass layers can disturb the path along which the laser beam would otherwise travel. Consequently, it is desirable to have uniformly symmetric and concentric glass layers about the centerline of the core of the fiber. Such concentric layers are achievable using the methods of the present invention.

Using the various embodiments of the invention disclosed herein, a number of additional advantages over other methods known in the art may be achieved. For example, the amount of water and other impurities, such as transition metals, trapped within the centerline region of the core blank prior to the core blank being drawn into an optical fiber can be greatly reduced. Accordingly, optical waveguide fiber made from such a core blank exhibits a much smaller water peak at 1380 nm, and in the 1380 nm window as a whole, therefore exhibits lower optical attenuation in a 1380 nm window than an optical waveguide fiber manufactured in accordance with standard methods from preforms manufactured by the OVD process. Further, optical waveguide fiber made from such a core blank exhibits reduced attenuation losses.

An additional advantage of the methods of the present invention is that optical waveguide fiber manufactured with such methods can now operate at any selected wavelength over a range of wavelengths from about 1300 nm to about 1680 nm without undue optical attenuation. Moreover, the method of the present invention is also economical to implement and can be practiced without the production of additional environmentally unfriendly waste products.

Another potential advantage of the method of manufacture of the present invention is that the optical fibers produced according to the method may have less voids along their centerline. Elimination of the vacuum forces during hole diameter reduction and/or hole closure significantly reduces the likelihood of voids in the fiber, thereby reducing the light reflections associated therewith.

These and other advantages of the invention will be further understood and appreciated by those skilled in the art by reference to the following written specification, claims, and appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of the specification. The drawings illustrate various embodiments of the invention, and together with the description serve to explain the principals and operation of the invention.

BRIEF DESCRIPTION OF THE DRAWINGS

FIG. 4 is a schematic view which illustrates an outside vapor deposition process for making a soot core blank;

FIG. 9 is a cross-sectional view of an inner handle located within an outer handle with a breaking tab of the inner handle juxtaposed from a bent tab of the glass preform taken along section line IX-IX, FIG. 8;

FIG. 10 is a cross-sectional view along the same plane as FIG. 9 showing the breaking tab of the inner handle in contact with the bent tab of the glass preform;

FIG. 11 is an enlarged fragmentary cross-sectional view of the glass preform located within the draw machine shown with the bent tab of the glass preform snapped off;

FIG. 12 is an enlarged fragmentary cross-sectional view of the glass preform located within the draw machine showing the inner handle disengaged from the outer handle;

FIG. 13 is a flow diagram of the steps to the method of the present invention;

FIG. 15 is a schematic view of a fiber optic communication system employing an optical fiber of the present invention.

DETAILED DESCRIPTION OF THE PREFERRED EMBODIMENT

Figure 1:
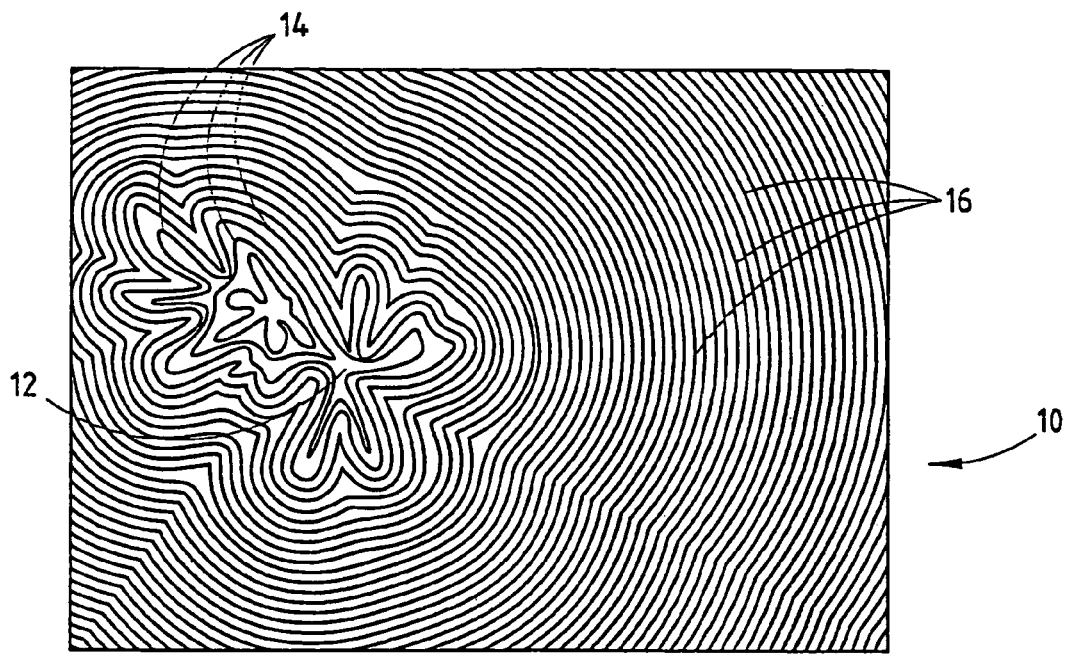
FIG. 1 is a schematic view of a centerline profile of a cross section of a core cane formed using a vacuum force during the redraw operation used to make a core cane.

Reference will now be made in detail to the present preferred embodiments of the invention, examples of which are illustrated in the accompanying drawings. Wherever possible, the same reference numerals will be used throughout the drawings to refer to the same or like parts.

Figure 2:
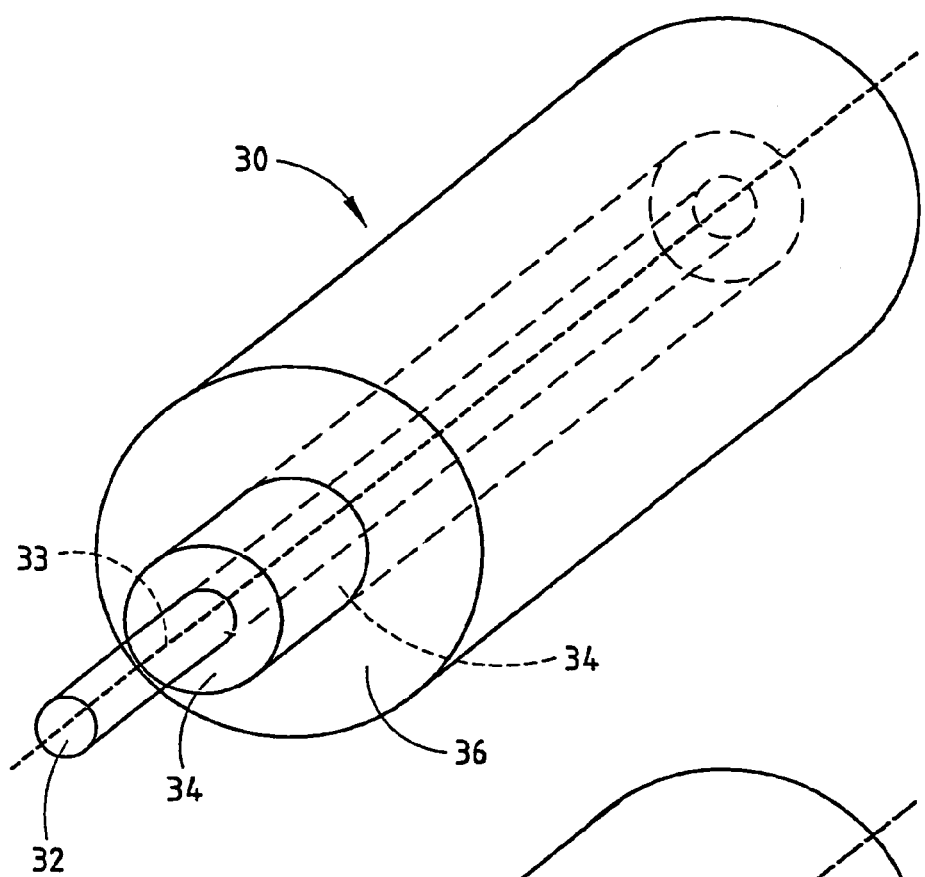
FIG. 2 is a fragmentary perspective view of an optical waveguide fiber.
Figure 3:
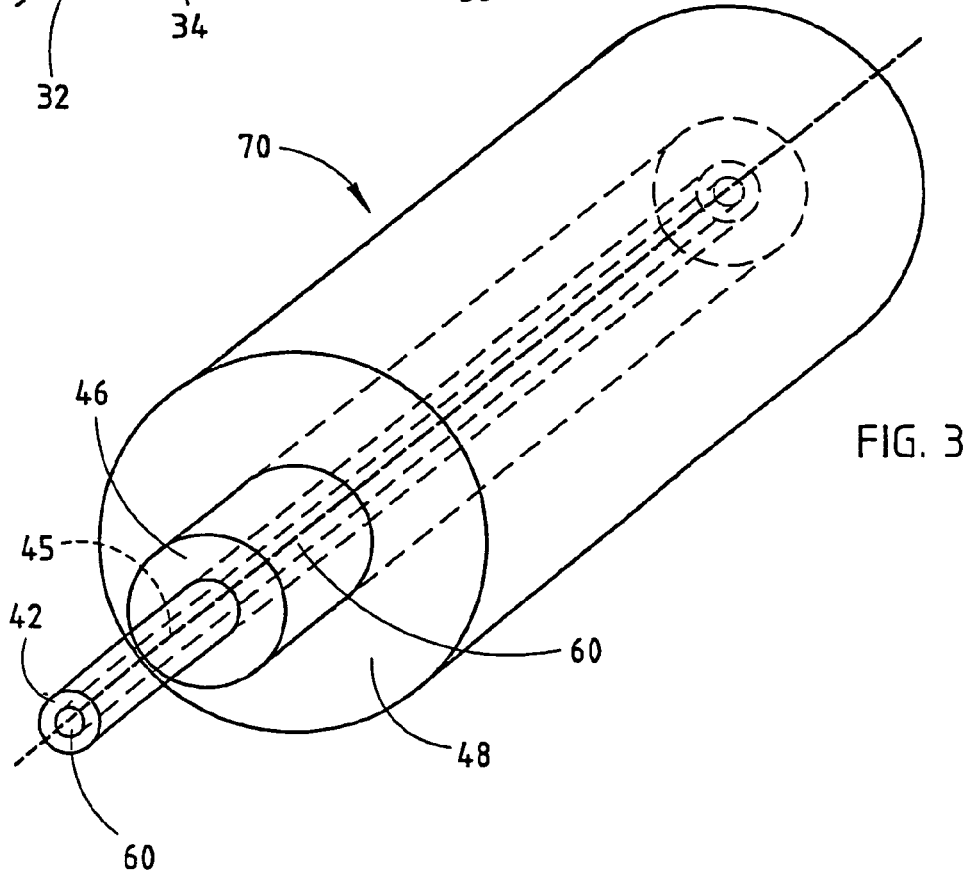
FIG. 3 is a fragmentary perspective view of a glass optical fiber preform.

Referring initially to FIG. 2, an optical waveguide fiber 30 manufactured by the method of the present invention is shown. The optical waveguide fiber includes a central core region 32 having a centrally located axis 33, an outer glass core region 34 and a coaxial cladding region 36. Optical waveguide fiber 30 is formed from a cylindrical glass body or glass preform 70 (FIG. 3) having a central core region 42 with a longitudinally extending, centrally located centerline hole 60 extending therethrough defining a centrally located axis 45. Preform 70 also includes an outer glass core region 46 and cladding region 48 both coaxial with core region 42. For example, central core region 32 and 42 could consist of germanium doped central region, and region 34 and 46 could consist of additional regions having various amounts of fluorine and/or germania dopants, to form a complex index of refraction profile (e.g., a segcor profile). Of course, the invention is not limited to use with these dopants, nor is it limited to fibers having complex index of refraction profiles. Instead, region 34 may be omitted, and the fiber may be a simple step index profile. Also, region 34 could include a near clad region, which consists of pure silica typically.

In accordance with one embodiment of the invention, cylindrical glass preform 70 is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous body, at least a portion of which includes hydrogen bonded to oxygen.

The porous body may be formed, for example, by depositing layers of soot onto a bait rod via an outside vapor deposition ("OVD") process. Such an OVD process is illustrated in FIG. 4. In FIG. 4, a bait rod or mandrel 50 is inserted through a tubular integral handle 52 and mounted on a lathe (not shown). The lathe is designed to rotate and translate mandrel 50 in close proximity with a soot-generating burner 54. As mandrel 50 is rotated and translated, silica-based reaction product 56, known generally as soot, is directed toward mandrel 50. At least a portion of silica-based reaction product 56 is deposited on mandrel 50 and on a portion of integral handle 52 to form a cylindrical soot porous body or soot core blank 58 thereon having a proximal end 59 and a distal end 61. While this aspect of the present invention has been described in conjunction with a translating lathe, it will be understood by those skilled in the art that soot-generating burner 54 can translate rather than the mandrel 50. Moreover, this aspect of the present invention is not intended to limit soot deposition to an OVD process. Rather, other methods of chemically reacting at least some of the constitutes of a moving fluid mixture, such as, but not limited to, liquid or vapor phase delivery of at least one glass-forming precursor compound in an oxidizing medium can be used to form the silica-based reaction product of the present invention. Moreover, other processes, such as the inside vapor deposition process (IV), and modified chemical vapor deposition process (MCVD) are also applicable to the present invention. The present invention is most preferably not intended for use with a rod in-soot optical waveguide preform production methods, but rather is more preferably used to close centerline holes.

Figure 5:
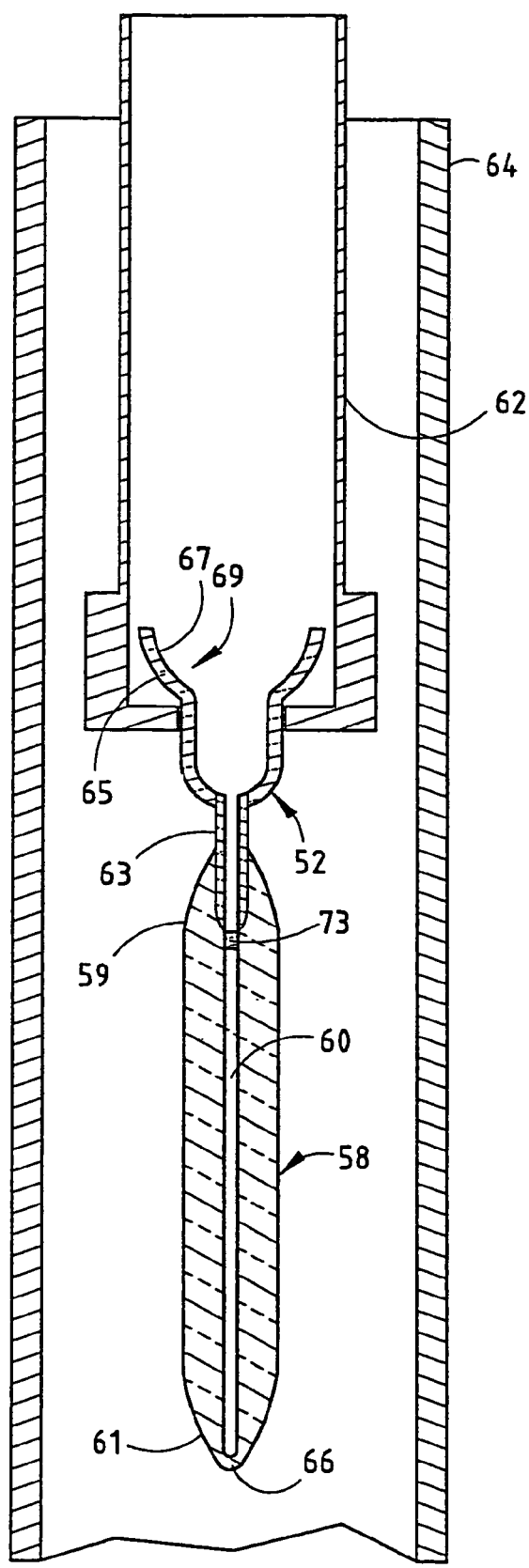
FIG. 5 is a vertical cross-sectional view of a soot core blank located within a consolidation furnace.

Once the desired quantity of soot has been deposited on mandrel 50, soot deposition is terminated and mandrel 50 is removed from soot core blank 58. Upon removal of mandrel 50, soot core blank 58 defines an axially extending void or centerline hole 60 (FIG. 5). Soot core blank 58 is vertically suspended within a consolidation furnace 64A by a downfeed handle 62 engaging integral handle 52. Consolidation furnace 64A preferable concentrically surrounds the soot core blank 58. Integral handle 52 is formed of a silica based glass material and includes a first end 63 about which proximal end 59 of core blank 58 is formed, and a second end 65 defining an inner surface 67 therein. Alternatively, second end 65 of integral handle 52 may be flame worked thereon subsequent to the deposition and consolidation steps. Integral handle 52 is generally cup-shaped and defines an interior cavity 69. Inner surface 67 is preferably provided with a coarse texture, the significance of which is discussed below. Centerline hole 60 located near distal end 61 of soot core blank 58 is preferably fitted with a glass bottom plug 66 prior to positioning porous body 58 within consolidation furnace 64A. Glass plug 66 is preferably made from a relatively low melting point glass (e.g. lower than that of the soot core blank) so that during consolidation, as the soot of the soot core blank is consolidated into glass, the glass plug will effectively seal the end of the centerline hole. While inserting bottom plug 66 is the preferable method for closing the distal end 61 of porous body 58, other methods and devices sufficient to close distal end 61 to prohibit airflow therethrough may be employed such as, but not limited to, flaming and/or crimping the end 61 shut.

The centerline hole 60 at proximal end 59 of core blank 58 may remain open to ambient air or may be closed by inserting a top plug 73 into centerline hole 60 prior to the consolidation step similar to bottom plug 66. In one embodiment, to facilitate such plugging of the hole, the hole inside the integral handle is made larger than the hole inside the soot preform 58, and the size os plug 73 is selected to be intermediate these two internal diameters, so that the plug can be inserted through the integral handle portion 52, but gets stuck in the centerline hole region of preform 58. In an alternative embodiment, top plug 73 may consist of a thicker region (thick enough to plug the centerline hole 60 within the soot preform 58) at a bottom end which serves to plug the centerline hole 60 of soot preform 58, another thick region (thicker than the centerline hole in integral handle 52) at the top end of the plug to prevent the plug 73 from falling into the centerline hole 60 of soot preform 58, and an intermediate region between the two ends to connect these two thicker end regions.

Soot core blank 58 is preferably chemically dried, for example, by exposing soot core blank 58 to a chlorine containing atmosphere at an elevated temperature within consolidation furnace 64A. The chlorine containing atmosphere effectively removes water and other impurities from soot core blank 58, which otherwise would have an undesirable effect on the properties of optical waveguide fiber manufactured from blank 58. In an OVD formed soot core blank 58, the chlorine flows sufficiently through the soot to effectively dry the entire blank 58, including the region surrounding centerline hole 60. Following the chemical drying step, the temperature of the furnace is elevated to a temperature sufficient to consolidate the soot into a sintered glass core blank 55.

Figure 5A:
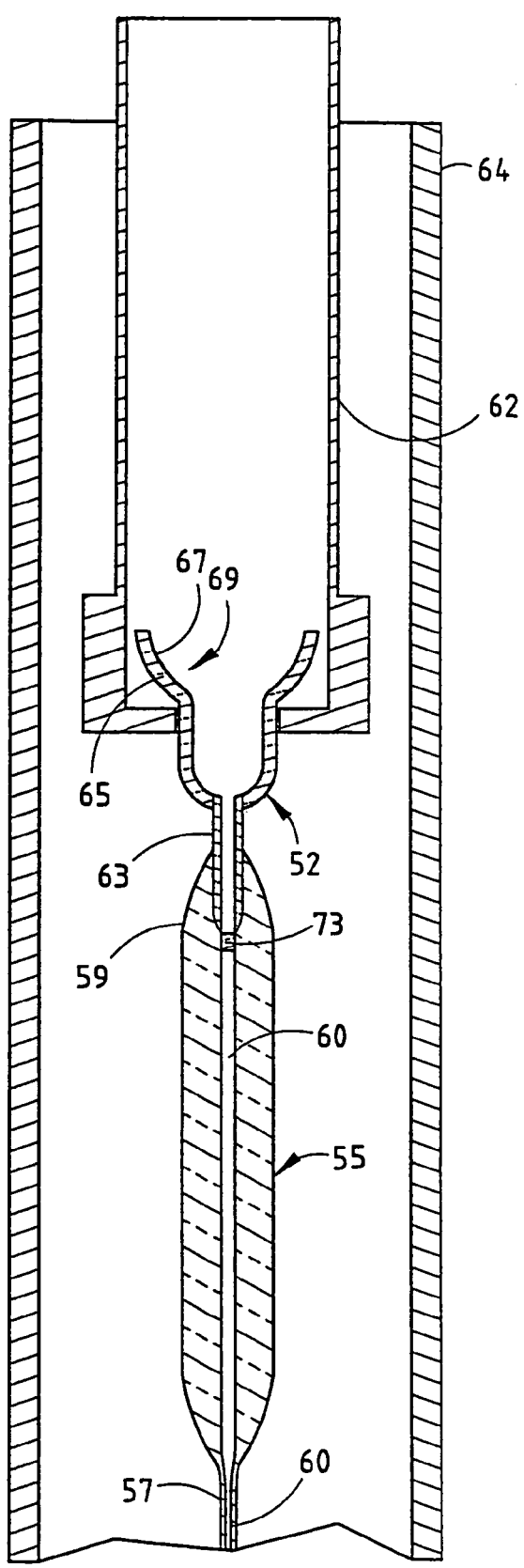
FIG. 5A is a vertical cross-sectional view of a soot core blank being drawn into a glass core cane.

The glass core blank 55 can then be used to form an intermediate glass object such as a core cane 57, if desired. Intermediate glass objects, as used herein, means a glass object that can be used in the manufacture of optical waveguide fiber, and which includes optical fiber preforms, core canes, rod and tube assemblies, and the like. Preferably, however, the hole is a centerline hole, and thus is not due to rod in tube techniques per se. Core cane, as used herein, has the conventional meaning in the art, that is, a consolidated glass rod or tube which includes at least a portion of the core region for an optical fiber preform, to which additional core and/or cladding material is added to form a complete optical fiber preform. To draw the glass core blank into a core cane 57 (FIG. 5A), the temperature of redraw furnace 64B is raised to a temperature which is sufficient to reduce the diameter of the consolidated glass core preform blank 55 to form core cane 57. During this redraw operation in which the consolidated core blank 55 is drawn into more narrow core cane 57, centerline hole 60 will also narrow along with the outside diameter of core cane 57 (this narrowing is not illustrated in the drawings). Preferably, however, centerline hole 60 does not completely close, as normally the diameter reduction of the initial outside diameter of core blank 55 is not sufficient, with respect to the initial inside diameter of centerline hole 60, to close centerline hole 60 without the aid of significant vacuum forces. Centerline hole 60 preferably remains closed at both ends so that, in effect, after the glass has been chemically dried and consolidated, there is no opportunity for the glass to take on water along centerline hole 60 during redraw into separate canes.

Figure 5B:
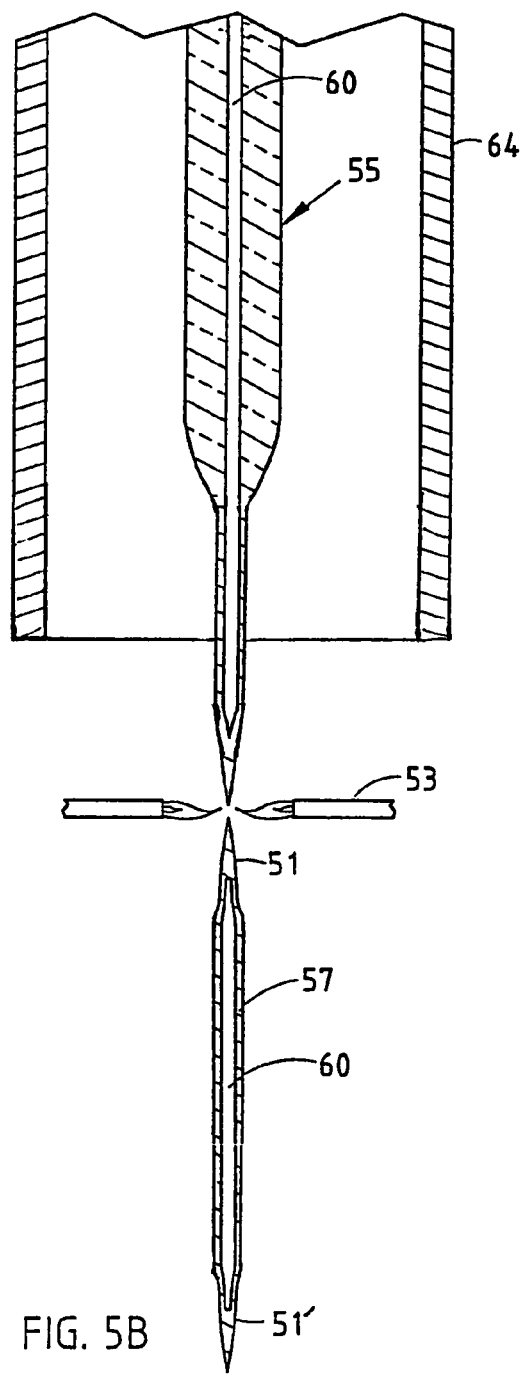
FIG. 5B is a vertical cross-sectional view of a core cane being cut from a glass core blank.
Figure 6:
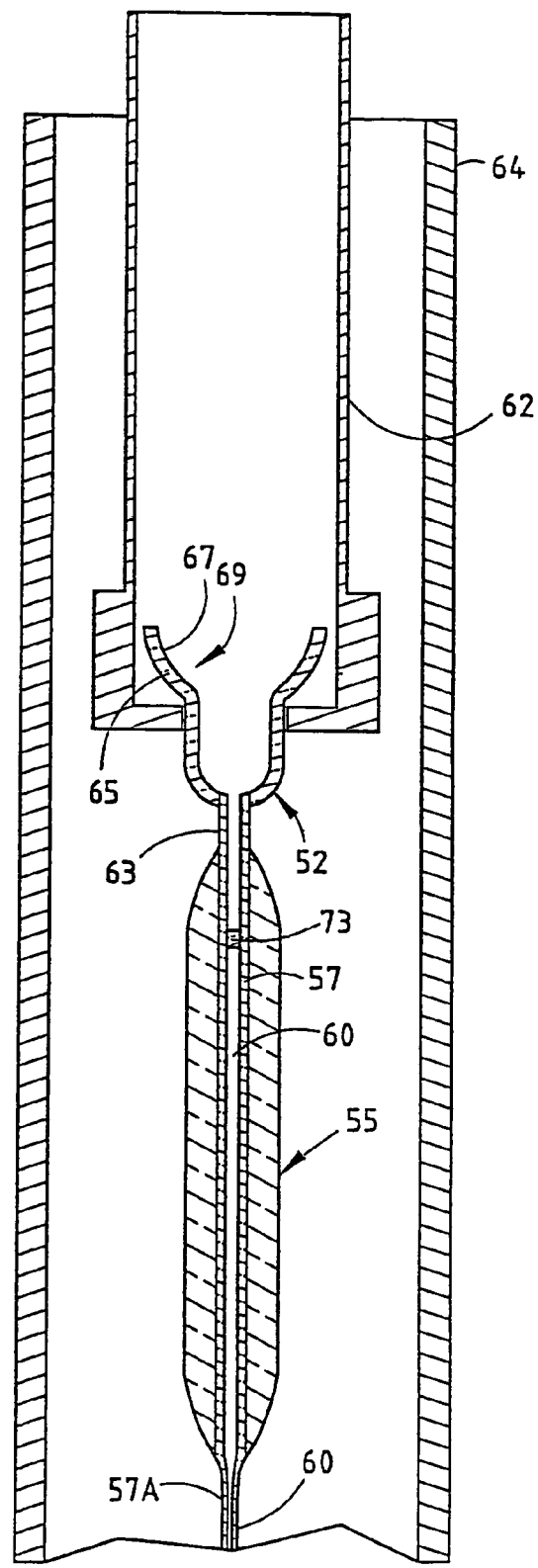
FIG. 6 is a vertical cross-sectional view of a core cane which has been overcladded with additional soot, located within a consolidation and redraw furnace.

During the core cane redraw operation, the ends 51 and 51' of core cane 57 (FIG. 5B) are sealed shut as they are separated from the core blank 58 by a plurality of torches 53 or dry heat sources (i.e., electric resistance furnaces) symmetrically spaced about core cane 57 which is being redrawn. Such a sealing step may be accomplished, for example, by flaming shut (as shown) or crimping shut the semi-molten ends of core cane 57 as each core cane 57 is separated. Sealing each end of core cane 57 without exposing centerline hole 60 to ambient air greatly reduces the amount of water and other impurities, such as transition metals, trapped within the centerline region associated therewith. Once the final glass core blank 55 (FIG. 6) that will be drawn into optical fiber is formed, bent tab 68 is drawn/pulled from the end of core cane 57 (FIG. 7) located nearest integral handle 52. This can be done by flame working and bending the end of core cane 57. Bent tab 68 extends radially outward from the center of glass preform 70. An integral handle 52 such as that shown in FIG. 6 is then attached to an end of each core cane 57 by flame working or any other suitable method which does not expose space 60 to the atmosphere.

Figure 7:
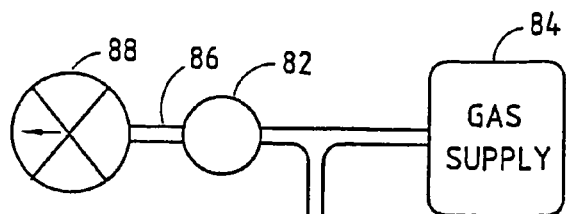
FIG. 7 a vertical cross-sectional view of a fully consolidated glass optical fiber preform located within a draw machine shown in schematic form.

In the preferred embodiment, the core cane 57 is then moved to a cladding station, where additional core material and/or cladding material is overlaid on core cane 57. The overcladding step is identical to the initial soot deposition technique used to form the core soot blank 58 (FIG. 4), except instead of depositing the cladding soot onto a mandrel 50 it is overlaid onto core cane 57. This clad overlaying step may be accomplished by depositing the cladding material onto core cane 57 via, for example, soot deposition, or alternatively by inserting the cane into a cladding sleeve. This process may be repeated several times if additional core soot regions are to be formed, by placing the resultant glass core blank 55 (FIG. 6) within furnace 64 and drawing or pulling a new core cane 57A therefrom and then depositing still additional soot material thereon. Once the glass core cane has been overlaid with soot cladding, is then moved to a consolidation furnace, where the soot cladding is chemically dried and then consolidated into glass onto core cane 57 to form a complete glass fiber preform 70 (FIG. 7).

In the past, and as described earlier in this application, following chemical drying and consolidating of the numerous soot layers, the glass preform 70 was routinely exposed to a water containing environment, such as ambient atmosphere, at any one of several steps subsequent to the forming of the core blank and prior to the formation of optical fiber therefrom. It is now recognized that physisorbed water and chemisorbed water in the glass bounding the centerline hole 60 occurs almost instantaneously when the glass is exposed to atmosphere containing a hydrogen compound such as, but not limited to water ($H_2O$). Moreover, the greater the exposure time, the greater the amount of water absorbed by the glass. Thus, any exposure to ambient atmosphere, or any atmosphere containing a hydrogen compound, no matter how short the period of time, may rewet the portion of the glass preform bounding the centerline hole. Such rewetting provides the impurities that cause the water peak exhibited by optical waveguide fibers manufactured using standard fiber manufacture processing techniques from blanks formed by an OVD process.

Another disadvantage of exposing the centerline hole 60 of the glass preform 70 is that the centerline hole 60 may be exposed to other contaminates and impurities such as transitional metals. The inclusion of transitional metals within the resultant optical fiber contributes to attenuation losses. By completely sealing each end of centerline hole 60 as seen in FIG. 5B, the exposure of centerline hole 60 to detrimental impurities may be reduced or eliminated. Other techniques for avoiding water contamination are disclosed, for example, in U.S. Provisional Patent Application No. 60/131,033, filed Apr. 26, 1999, the specification of which is hereby incorporated by reference.

Several other variations to the method of the present invention, as shown in FIG. 13, are described below. While several variations to the method disclosed herein have been described, the specific embodiments are not intended to be limiting, but merely exemplary of the sequential steps possible.

Figure 8:
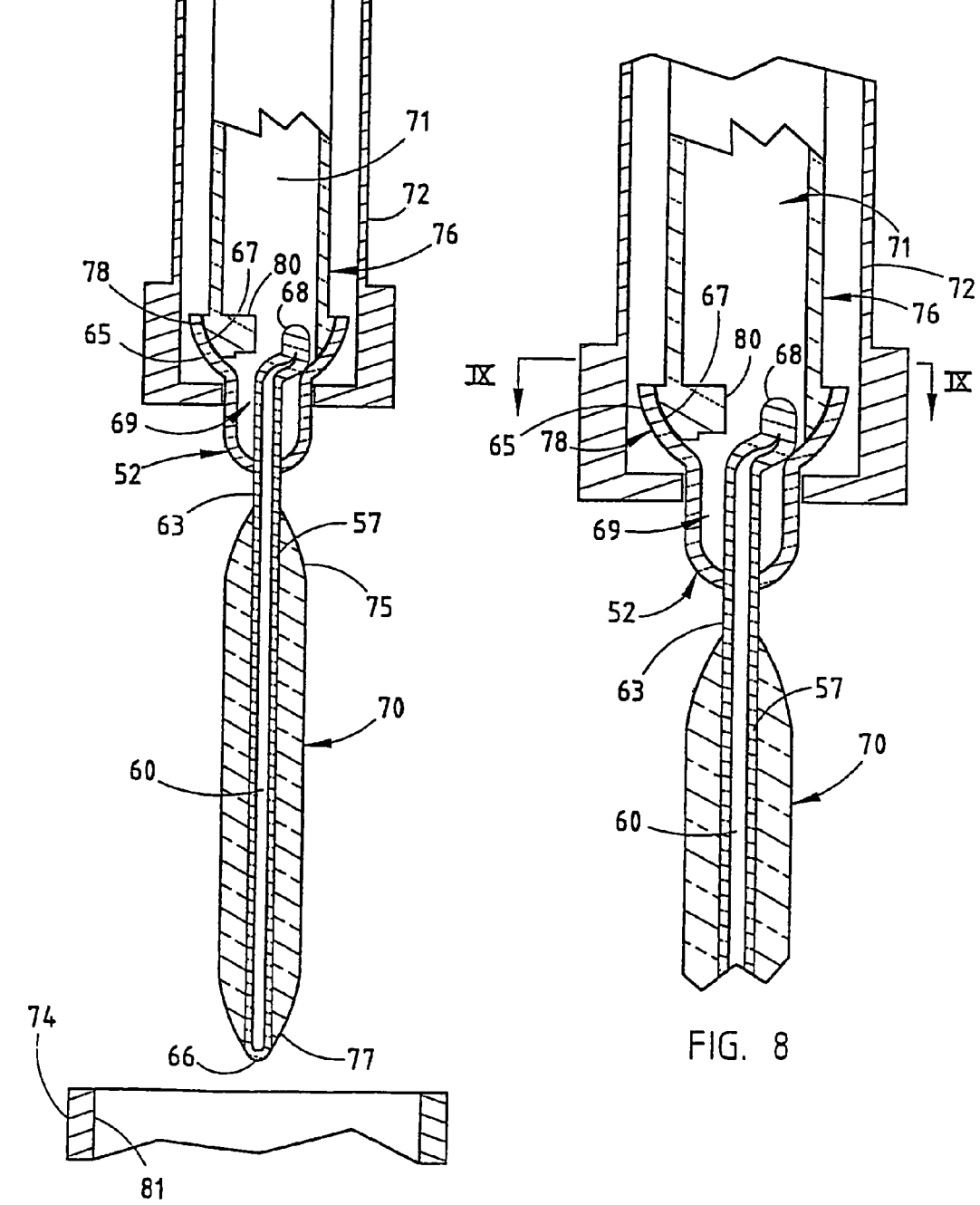
FIG. 8 is an enlarged fragmentary cross-sectional view of the glass optical fiber preform shown in FIG. 7.

Once the sintered glass preform 70, which includes core cane 57 overlaid with a cladding (FIG. 7), is formed it is moved to a draw furnace, preferably in a vertical orientation, for drawing the glass preform 70 into an optical waveguide fiber, as represented by step 100, FIG. 13. The glass preform 70 is suspended by integral handle 52 on downfeed handle 72, as represented by step 102. The furnace employed herein for hole closure of the intermediate glass object (regardless of whether the intermediate glass object is a core cane or, as in this case, an optical fiber preform) preferably employs a heat source which is symmetric about the periphery of the glass intermediate object. For example, in a preferred embodiment, the heat source is a vertically oriented, cylindrical furnace having gradient heat zones. One such furnace employs heat zones of increasing temperature from top to bottom up. Consequently, as the glass intermediate object is inserted into the top of the furnace and lowered into it, the hole closes from the bottom. The ratio of the outside diameter of the intermediate object to the inside diameter of the centerline hole to be closed is great enough that, under sufficient reduction of the outside diameter, the hole closes without the need for negative pressure that would otherwise cause the hole to close non-uniformly. The downfeed handle 72 is positioned within and translatable within the draw furnace (not shown), and glass preform 70 is lowered within a draw furnace 74 which defines an interior wall 81, such as illustrated in FIG. 7. Preferably, glass preform 70 is encircled by interior wall 81 of draw furnace 74. A cylindrical inner handle 76 FIGS. 7 and 8) having a radially, inwardly extending breaking tab 80 that is mated within integral handle 52 such that a lower end bowl-shaped, coarse textured mating surface 78 of inner handle 76 forms a substantially airtight seal with mating surface 67 of integral handle 52, as shown by step 104. Handle 76 has an interior cavity and at its lower end includes a breaking tab 80 which extends radially inwardly such that relative rotation between integral handle 52 and inner handle 76 causes breaking tab 80 of inner handle 76 to engage bent tab 68 of glass preform 70, as further discussed below.

In one embodiment, glass preform 70 is lowered into draw furnace or hot zone 74 for a sufficient time period to increase the gas pressure within centerline hole 60 of glass preform 70, as represented by step 106. Glass preform 70 is then removed from within hot zone 74, as represented by step 108. A negative pressure is applied to interior cavity 71 of inner handle 76 and interior cavity 69 of integral handle 52, thereby removing contaminates such as $H_2O$ as well as other particulate matter therefrom, as represented by step 110. The interior cavity 71 of inner handle 76 and the interior cavity 69 of integral handle 52 are then backfilled with a dry inert or drying gas (e.g. chlorine), as represented by step 112, from a gas supply 84 (FIG. 7). The supply of dry or drying gases is preferably provided so that if any gas enters centerline hole 60 of glass preform 70, it is a clean dry gas that will not lead to attenuation induced losses within the resultant optical waveguide fiber.

Centerline hole 60 of glass preform 70 is then opened by snapping bent tab 68 of glass preform 70, as represented by step 114. Alternatively, bent tab 68 can be scribed by at a point closer to the end of bent tab 68 than to the location at which bent tab 68 and integral handle 52 are connected, followed by the snapping of bent tab 68 of glass preform 70. To snap bent tab 68 inner handle 76 is rotated relative to integral handle 52 such that breaking tab 80 of inner handle 76 engages bent tab 68 of glass preform 70, as shown in FIGS. 9 and 10, to break tab 68. Breaking bent tab 68 (FIG. 11) of glass preform 70 exposes centerline hole 60 of glass preform 70 to the gas within interior cavity 69 of integral handle 52, thereby reducing or eliminating possible contamination of centerline hole 60 prior to the drawing of optical waveguide fiber from preform glass 70. While rotating inner handle 76 relative to integral handle 52 is preferred, integral handle 52 could be rotated with respect to inner handle 76. Further, both inner handle 76 and integral handle 52 may be rotated with respect to one another.

After snapping bent tab 68 from glass preform 70 (FIGS. 7 and 11), a dry or drying gas is continuously passed over inner handle 76 thereby maintaining interior cavity 71 of inner handle 76, interior cavity 69 of integral handle 52, and centerline hole 60 of glass preform 70 free of contaminants and from being recontaminated, as represented by step 116. A valve 82 is used to control the flow of gas from the gas supply 84 and whether the gas is directed directly to interior cavity 71 of inner handle 76 or vented to an exhaust tube 86. Exhaust tube 86 is coupled with a one-way valve 88 that prevents the entry of air into exhaust tube 86 and the contamination of centerline 60 of glass preform 70 by ambient air and the contaminant matter associated therewith, as represented by step 118. One-way valve 88 may be provided in the form of a bubbler, a check valve, or any other form of a one-way valve that prevents the backflow of ambient air into exhaust tube 86. Alternatively, exhaust tube 86 may be provided at such a substantial length that the backflow of ambient air into exhaust tube 86 is prevented from reaching centerline hole 60 of glass preform 70.

After the centerline hole 60 (FIG. 11) of the glass preform 70 has been opened and purged, the glass preform 70 is lowered further into the hot zone of furnace 74 and/or the temperature is increased to a temperature sufficient to allow an optical waveguide fiber 79 to be drawn from glass preform 70, as represented by step 130.

In the fiber draw step 130, the glass preform 70 is drawn into optical fiber 30 (FIG. 2), the centerline hole 60 of glass preform 70 closing during the fiber drawing step 130. As the glass preform 70 is drawn to optical fiber 30, the outside diameter of the glass preform 70 gradually reduces. Because the outside diameter of the preform is sufficiently large with respect to the inside diameter of the hole to be closed, the forces internal to the glass preform generated by this reduction on the outside diameter of the glass preform 70 causes centerline hole 60 to close as well. Closure forces, including surface tension and capillary forces during the fiber draw step 130 differ from the vacuum forces typically used during redraw in conventional optical fiber manufacturing techniques or in tube collapse in MCVD or IV plasma processes. Typically in glass preforms 70 which are manufactured entirely by an OVD process, the glass preform 70 may be as wide as 7 to 15 cm, and the inside diameter of centerline hole 60 between 1 to 10 mm. Consequently, the reduction in outside diameter of the fiber preform, which may range, for example from 7 to 15 cm, down to the outside diameter of a typical optical waveguide fiber (e.g., 125 microns) creates adequate forces due to the surface tensions and capillary forces involved in the reduction of the outside diameter, so that the centerline hole 60 closes completely during the draw operation without having to resort to the use of any significant vacuum. In particular, the centerline hole is capable of closing completely during the fiber draw step 130 with low vacuum, i.e., greater than 1 Torr, more preferably greater than 8 Torr, even more preferably greater than 100 Torr, and even more preferably greater than 500 Torr, applied to the hole during the hole closure/diameter reduction step. Most preferably the pressure applied to the centerline hole 60 is about equal- to atmospheric pressure (i.e. about 750-760 Torr) or even slightly positive (i.e., about 764.6 Torr, where atmospheric pressure is assumed to be equal to 760 Torr) such as that caused by the purge pressure of the gas or drying gas entering centerline hole 60. Preferably, a slightly positive pressure of between about 761.8-769 Torr is maintained during the draw operation. In this way, centerline hole 60 can be maintained under a pressure during the fiber drawing step 130 which is sufficient to result in a circular symmetry about axis 33 (FIG. 2) of optical fiber 30. The pressures disclosed herein are absolute pressures.

Figure 14:
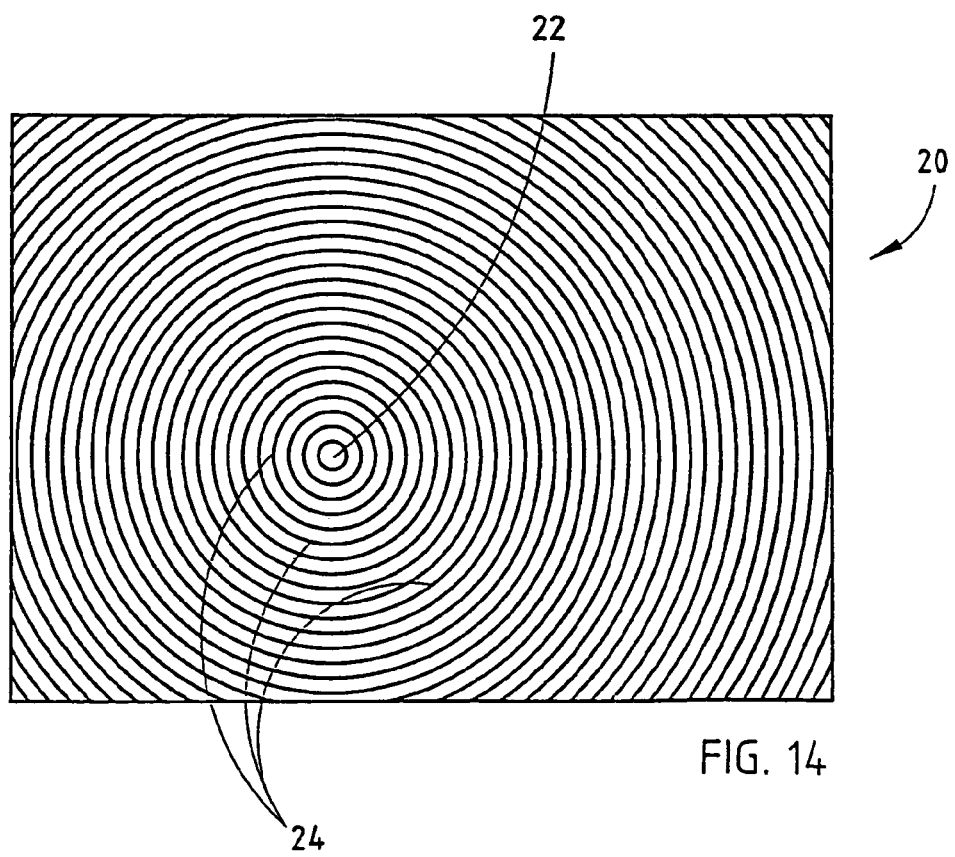
FIG. 14 is a schematic view of a substantially symmetric centerline profile of a cross section of an optical waveguide fiber made in accordance with the present invention.

FIG. 14 illustrates a cross-section of a center region of an optical fiber, indicated generally at 20, which includes a center point 22 surrounded by symmetrically shaped layers of glass 24. This symmetric centerline profile decreases polarization mode dispersion in single mode fibers and greatly facilitates the ability to fabricate the appropriate index profile to yield high bandwidth in multimode fibers by enabling the profile in the centerline region to be turned to a desired refractive index profile.

In an alternative variation to the preferred embodiment, bent tab 68 can be snapped prior to applying the low vacuum to inner handle 76 and integral handle 52, as represented by the attenuate method of FIG. 13 at step 120. Subsequent to snapping bent tab 68 in step 120, a low vacuum is drawn on inner handle 76 (FIG. 7) and interior cavity 69 of integral handle 52, and thus to centerline hole 60 of glass preform 70, thereby removing the above discussed contaminates from within interior cavity 71 of inner handle 76 and interior cavity 69 of integral handle 52, as well as from within centerline hole 60 of glass preform 70. The vacuum applied during this step is much less than that typically required to collapse the centerline hole 60 of glass preform 70, as represented by step 122, the specific amounts of which are discussed above. The interior cavity 71 of inner handle 76, interior cavity 69 of integral handle 52 and centerline hole 60 of glass preform 70 are then backfilled with a dry or drying gas, as represented by step 124. It has also been determined that centerline hole 60 of glass preform 70 can be exposed to a dry or drying gas without drawing a vacuum on centerline hole 60 of glass preform 70, as represented in step 126. It should be noted that it is preferable that the centerline hole 60 of glass preform 70 not be exposed to ambient air at any time if the centerline hole 60 is under a vacuum as set forth in step 122 and only exposed to a dry or drying gas as set forth in step 126.

Exposing the interior cavity 69 (FIG. 12) of integral handle 52 to ambient air by removing the connection between inner handle 76 and integral handle 52, as represented by step 128, will likely increase hydrogen induced attenuation of the resultant optical waveguide fiber. Consequently, the space 90 surrounding integral handle 52 is preferably continuously purged with dry or drying gas from source 84 (FIG. 7) after disengagement of the inner handle 76 from integral handle 52.

This method of forming the optical waveguide fiber is completed in a similar fashion to that described for the preferred embodiment above, except that the glass preform 70 is not lowered within hot zone 74 prior to a vacuum being drawn on interior cavity 71 of inner handle 76, step 110, and/or snapping bent tab 68 from glass preform 70, step 120.

While glass preform 70 is being heated within hot zone 74 a sphere of molten glass 91 will begin to collect at distal end 77 of glass preform 70. If the centerline hole 60 is constantly purged in step 112 or step 124, while the glass preform is heated within the hot zone, it may be necessary to decrease or eliminate the purge pressure of the dry or drying gas to prevent the enlargement of the glass sphere 91. Allowing the glass sphere 91 to increase to the point of rupture may allow the dry or drying gas to exit distal end 77 of glass preform 70 and hinder the closure of centerline hole 60 and the formation of an optical waveguide fiber 30 (FIG. 2) having a solid center core 32. In addition, allowing glass sphere 91 to rupture might allow ambient air to enter and contaminate centerline hole 60 and the resultant optical waveguide fiber. The purge pressure of the dry or drying gas in centerline hole 16 is therefore preferably maintained low enough during the drawing of the optical waveguide fiber from the glass preform 70 that the glass gob or sphere 91 does not rupture and further that, as the centerline hole 60 closes during the draw step 130, the gas present in the centerline hole 60 can escape by flowing back through integral handle 52, thereby allowing the centerline hole 60 to close without creating gas filled voids within the resultant fiber.

Referring now to FIG. 14, there will be seen a centerline profile, generally indicated 20, of a cross section of an optical fiber preform for a single mode fiber manufactured using the method of the present invention. The cross-section was taken at the root of the preform subsequent to a single mode optical fiber draw operation, in a region where the preform was about 1 cm wide. As seen in FIG. 14, the centerline profile 20 has a substantially circular symmetry about centerline 22. The layers of glass 24 proximate the center point 22 and circling center point 22 are very symmetric and circular. While the cross-section was taken at the root, rather than the actual optical fiber, the same uniform symmetry will be present in the resultant optical fiber drawn from the preform. In addition, the same results are achievable on multimode fiber core canes and the resultant optical fibers drawn therefrom. Single mode core canes have been made having a degree of symmetry and concentricity, to the layers adjacent the center point 22, which is sufficient to result in a polarization mode dispersion value of less than 0.02 psec/sqrt-km. The center point 22, which in FIG. 14 is offset from the center of the figure itself, falls on a centerline that extends along the length of the optical fiber. Likewise, the circular symmetry extends along the entire length of the optical fiber.

Using the methods disclosed herein, optical fibers can be achieved which have an outside diameter of 125 microns, yet the layers of glass surrounding the centerline are sufficiently symmetrical that, at a distance of about 0.1 micron from the centerline, the glass layers deposited have a radius which varies less than 0.025 microns, i.e., the maximum radius minus the minimum radius of any glass layer, located between about 0.08 to 0.15 microns from the centerline, is less than 0.025 microns, more preferably less than about 0.015 microns. Using the techniques disclosed herein, applicants have been able to achieve such fibers. Comparing the centerline profile of a fiber produced by the subject method, as shown in FIG. 14, to the centerline profile of a fiber produced by a conventional method, as shown in FIG. 1, the centerline profile of the conventionally-manufactured fibers does not exhibit such uniform symmetry and concentricity of layers. Conversely, the fiber made in accordance with the invention exhibits concentric and symmetric regions of glass about its centerline.

Low levels of polarization mode dispersion have been achieved with the methods of the present invention without having to use a vacuum at any point during the manufacture or process to close centerline hole 60 (FIG. 7), and without having to resort to spinning techniques during the fiber draw step 130 (FIG. 13). More specifically, the manufacturing method of the claimed invention enables the formation of single mode optical fiber having a polarization mode dispersion value of less than 0.2 psec/sqrt-km, more preferably less than 0.1 psec/sqrt-km, and most preferably less than 0.05 psec/sqrt-km. Single mode optical fibers have been achieved, using the methods described herein, having polarization mode dispersion value of less than 0.02 psec/sqrt-km, without having to resort to any spinning of the optical fiber during draw. Such spinning, which is typically imparted to the fiber during the draw operation to reduce PMD, results in the fiber having a spin in its structure. In fact, using the methods disclosed herein, we have achieved entirely unspun single mode fibers (in particular, Corning's LEAF non-zero dispersion shifted optical fiber) having PMD as low as 0.007 psec/sqrt-km, which is the detection limit of the PMD measurement equipment. The single mode optical fiber made in accordance with the invention is thus capable of achieving the low PMD values mentioned above while also exhibiting less than 3 such spin rotations, and preferably no spin rotation, over a longitudinal fiber length of 1 meter. Significantly, these low levels of polarization mode dispersion have been maintained while allowing centerline hole 60 to be purged with a clean, dry or drying gas, thereby simultaneously reducing hydrogen induced attenuation and achieving 0.19 dB/km at 1550 nm.

Multimode fiber can be manufactured using the same process as disclosed above with respect to single mode fiber manufacture. However, during the redraw and cladding deposition steps, the multimode core soot preform may not need to be closed at both ends, because attenuation is not as critical in multimode fibers. However, the centerline hole preferably is closed as is the case with single mode fiber described above. For multimode fiber, symmetric hole closure enables the centerline region of the fiber refractive index profile to be tuned to a desired, accurate profile shape. This enables better on center bandwidth when the resultant fiber is employed with the small spot sizes exhibited by laser sources.

As shown in FIG. 15, and in accordance with the present invention, an optical fiber 132 is manufactured in accordance with the present invention and used in an optical fiber communication system 134. System 134 includes a receiver 138, and an optical waveguide fiber 132 for transmitting an optical signal between the transmitter 136 and the receiver 138. In most systems, each end of the fiber 132 will be capable of two-way communication, and transmitter 136 and receiver 138 are shown for illustration only.

The methods disclosed herein can be employed not only to close a centerline hole at draw, but also other holes during a separate diameter reducing step, e.g., a redraw step to make core cane. If the ratio of the outside diameter of the intermediate glass object to the inside diameter of the hole present in the intermediate glass object is sufficiently large, forces can be generated by reducing the outside diameter of the intermediate glass object which are sufficient to close the centerline hole. Thus, if the outside diameter of the glass object is sufficiently large, a hole within the glass object can be closed during a diameter reduction operation, without having to utilize significant vacuum forces. In this way, the same symmetric hole closure can be achieved.

Also, while the invention has been disclosed herein largely with respect to the closing of centerline holes, the methods disclosed herein are not limited to closing centerline holes, and can be used to close virtually any void present along the length of an optical fiber preform or other intermediate glass articles for use in the manufacture of optical fiber. This includes voids that would be formed as a result of rod-in-tube manufacturing techniques, as well as voids formed by assembling a glass sleeve over pre-manufactured core blanks or canes.

The manufacturing methods of the subject invention provide for repeatable, symmetric, uniform centerline hole closure of a preform resulting in an optical waveguide fiber having low attenuation and low polarization mode dispersion. Additional advantages and modifications will readily occur to those skilled in the art. Therefore, the invention in its broader aspects is not limited to the specific details, and representative devices, shown and described herein. Accordingly, various modifications may be made to the method and preform disclosed herein without departing the spirit or scope of the general inventive concept as defined by the appended claims.

EXAMPLE

The following example, wherein a large effective area fiber known as LEAF optical fiber sold by Corning Incorporated was manufactured in accordance with the invention. Using OVD techniques, a germania-doped core consisting of an up-doped germania centerline region, surrounded by a moat region exhibiting an index of refraction roughly equal to that of silica, surrounded by an annular region which was again up-doped using germania, followed by a near clad region of $SiO_2$, was deposited as soot onto a $Al_2O_3$ ceramic mandrel. The ratio of the radius of the core region to the clad region was 0.4. The mandrel was then removed, and a top and bottom glass plug was inserted into the core soot preform. This core glass soot preform was then consolidated, by first cleaning the soot by exposure to 1 percent chlorine in helium carrier gas at 1000° C. for 2 hours, and then sintering at 1460° C. This consolidation step resulted in a cleaned and dried glass core preform having an outside diameter of about 60 mm and a hole along its centerline with an inside diameter of about 6 mm. The top and bottom glass plugs resulted in a sealing of both the top and bottom of this consolidated glass core preform. The consolidated glass core preform was then redrawn into hollow core canes by inserting the core preform into a furnace at 1900° C. and reducing the diameter of the preform to approximately 10 mm OD. This resulted in the hole being reduced to about approximately 1 mm inside diameter. As the core cane was drawn from the core preform, the hollow canes were measured to 1 meter lengths, and then flame cut and the ends sealed off by flame working, to thereby seal off the centerline and maintain the sealed centerline region of the core cane.

A handle was then attached to the end of the core cane, and additional soot was deposited onto the core cane to form optical fiber preforms suitable for drawing into optical fiber. This resultant soot body was then cleaned and consolidated as described above after which point the resultant glass optical fiber preform was approximately 56 mm outside diameter with a 1 mm diameter ID hole extending along the centerline of the glass optical fiber preform. The centerline hole was still sealed at both ends. The glass optical fiber preform was then attached to an integral integral handle 52 placed into the top of a draw furnace. The inner handle 76 was then lowered to mate with the integral handle 52 of the optical fiber preform. After providing a clean, dry environment consisting of 100% helium gas, the top of the core cane was snapped open, and the optical fiber preform was lowered into the furnace and fiber was drawn therefrom. By snapping off the top of the preform, gases were allowed to escape from the centerline hole, even though the pressure therein was maintain at atmospheric pressure. By the time the outside diameter of the preform had been reduced by approximately 1 or 2 mm, the inside centerline hole had completely closed extremely uniformly. Thus, the hole could be closed with less than a 10% diameter reduction in the optical fiber preform. The resultant optical fiber exhibited attenuation at 1550 of approximately 0.19 dB per kilometer, and exhibited a PMD of approximately 0.02 ps/sqrt km as measured on a 1 km sample of fiber on a conventional Hewlett-Packard measurement bench. The fiber was drawn entirely unspun, meaning that no spinning was imparted to the fiber or its preform during the draw operation.

The invention claimed is:

1. A single mode optical fiber, comprising:
    a fiber core comprised of layers of glass, said fiber core having a centerline; and
    a fiber cladding surrounding said fiber core, wherein the layers of glass surrounding the centerline are sufficiently circularly symmetric to result in a polarization mode dispersion of less than 0.1 psec/sqrt-km, and said fiber has less than about 3 spin rotations over a longitudinal fiber length of 1 meter.

2. The fiber of claim 1, wherein said fiber is in a substantially unspun state.

3. The optical fiber of claim 1, wherein said fiber is comprised of:
    concentric layers of glass; and
    any glass layer between about 0.08 to about 0.15 microns from the centerline exhibits a change in radial dimension around its periphery which is less than 0.025 microns.

4. The optical fiber of claim 3, wherein said change in radial dimension is less than 0.015 microns.

5. The optical fiber of claim 1, wherein said optical fiber is in an unspun state.

6. The optical fiber of claim 1, wherein said fiber is made in accordance with a method comprising the steps of:
    providing an intermediate glass object for use in the manufacture of optical fiber, the glass object having a hole therein at least one end of which is plugged preventing gas flow therethrough;
    heating the glass object to a temperature sufficient to reduce the outside diameter of the glass object;
    applying a pressure of equal to greater than 8 Torr to the void; and
    reducing the outside diameter of the glass object and causing the hole or annular void to close uniformly and symmetrically.

7. The optical fiber of claim 6, wherein said step of applying pressure includes applying a pressure of less than or equal to 750 Torr.

8. The optical fiber of claim 6, wherein said step of applying pressure includes applying a pressure of greater than 760 Torr.

9. The fiber of claim 6, wherein the fiber is in a substantially unspun state.

10. A single mode optical fiber, comprising:
    a fiber core comprised of layers of glass, said fiber core having a centerline; and
    a fiber cladding surrounding said fiber core, wherein the layers of glass surrounding the centerline are sufficiently circularly symmetric to result in a polarization mode dispersion of less than 0.3 psec/sqrt-km, and said fiber, and said fiber is in a substantially unspun state.

11. The optical fiber in claim 10, wherein said optical fiber exhibits a polarization mode dispersion value of less than 0.2 psec/sqrt-km.

12. The optical fiber in claim 10, wherein said optical fiber exhibits a polarization mode dispersion value of less than 0.1 psec/sqrt-km.

* * * * *